US008560698B2

(12) United States Patent
Kulkarni et al.

(10) Patent No.: US 8,560,698 B2
(45) Date of Patent: Oct. 15, 2013

(54) ALLOCATING UNIQUE IDENTIFIERS USING METADATA

(75) Inventors: Shrinivas Kulkarni, Bangalore (IN); Nisanth M. Simon, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 12/824,211

(22) Filed: Jun. 27, 2010

(65) Prior Publication Data

US 2011/0320604 A1  Dec. 29, 2011

(51) Int. Cl.
| G06F 15/16 | (2006.01) |
| G06F 15/173 | (2006.01) |
| G06F 15/177 | (2006.01) |
| G06F 21/00 | (2013.01) |

(52) U.S. Cl.
USPC ........... 709/226; 708/250; 707/803; 713/183; 713/184

(58) Field of Classification Search
USPC ............ 709/217–228; 707/803; 713/183, 184
See application file for complete search history.

(56) References Cited

U.S. PATENT DOCUMENTS

| 5,522,077 | A | 5/1996 | Cuthbert |
| 5,815,709 | A | 9/1998 | Waldo |
| 6,442,276 | B1 | 8/2002 | Doljack |
| 6,647,402 | B1 | 11/2003 | Chiu |
| 6,711,563 | B1 | 3/2004 | Koskas |
| 6,781,998 | B1 | 8/2004 | Karlsson |
| 6,973,665 | B2 * | 12/2005 | Dudkiewicz et al. ........... 725/46 |
| 7,010,542 | B2 * | 3/2006 | Trappen et al. ........ 707/999.001 |
| 7,051,365 | B1 * | 5/2006 | Bellovin .......................... 726/11 |
| 7,072,800 | B1 * | 7/2006 | Fernandez et al. ............ 702/186 |
| 7,096,216 | B2 * | 8/2006 | Anonsen ....................... 707/781 |
| 7,130,856 | B2 * | 10/2006 | Anonsen ....................... 707/781 |
| 7,136,873 | B2 * | 11/2006 | Smith et al. ................... 709/225 |
| 7,149,733 | B2 * | 12/2006 | Lin et al. ................ 707/999.004 |
| 7,249,181 | B2 | 7/2007 | Helliwell |
| 7,328,228 | B2 | 2/2008 | Klein |

(Continued)

FOREIGN PATENT DOCUMENTS

EP  1005237 B1  5/2000

OTHER PUBLICATIONS

PCT/EP2011/056427 International Search Report and Written Opinion for the International Searching Authority, Jul. 7, 2011 (9 Pages).

(Continued)

*Primary Examiner* — Haresh N Patel
(74) *Attorney, Agent, or Firm* — Anthony V S England; Ingrid M Foerster (57) ABSTRACT

A plurality of subgroups of identifiers are identified including at least a first subgroup of identifiers and a second subgroup of identifiers within an identifier range. A first set of identifiers is selected in the first subgroup. The first set of identifiers in the first subgroup is compared with a second set of identifiers in the second subgroup and a first set of common identifiers is identified using metadata of the second set of identifiers. A third set of identifiers is generated by eliminating the first set of common identifiers from the first set of identifiers. The third set of identifiers is compared with a fourth set of identifiers in a repository of stored identifiers, to identify a second set of common identifiers. A fifth set of identifiers is generated by eliminating the second set of common identifiers from the third set of identifiers.

22 Claims, 4 Drawing Sheets

(56) References Cited

U.S. PATENT DOCUMENTS

| | | | |
|---|---|---|---|
| 7,359,912 B2 * | 4/2008 | Trappen et al. | 709/217 |
| 7,376,668 B2 * | 5/2008 | Smith et al. | 707/999.001 |
| RE40,389 E | 6/2008 | Chiu | |
| 7,418,475 B2 * | 8/2008 | Stewart et al. | 709/204 |
| 7,421,735 B2 * | 9/2008 | Kerstens et al. | 726/12 |
| 7,434,247 B2 * | 10/2008 | Dudkiewicz et al. | 725/46 |
| 7,454,785 B2 * | 11/2008 | Kerstens et al. | 726/12 |
| 7,478,087 B2 * | 1/2009 | Lin et al. | 707/999.004 |
| 7,502,861 B1 * | 3/2009 | Protassov et al. | 709/229 |
| 7,512,645 B2 | 3/2009 | Pitz | |
| 7,555,447 B2 | 6/2009 | Chinnappan | |
| 7,571,142 B1 | 8/2009 | Filtcroft | |
| 7,606,831 B2 | 10/2009 | Quinn | |
| 7,630,986 B1 * | 12/2009 | Herz et al. | 707/999.01 |
| 7,693,145 B2 | 4/2010 | Rajagopalan | |
| 7,735,077 B2 * | 6/2010 | Laird | 717/170 |
| 7,766,740 B2 | 8/2010 | Penrice | |
| 7,904,494 B2 | 3/2011 | Cho | |
| 7,941,552 B1 * | 5/2011 | Protassov et al. | 709/229 |
| 7,979,569 B2 * | 7/2011 | Eisner et al. | 709/231 |
| 7,984,495 B1 | 7/2011 | Aravind | |
| 7,991,855 B2 * | 8/2011 | Kubsch et al. | 709/220 |
| 8,031,051 B2 | 10/2011 | Tsukamoto | |
| 8,068,010 B2 * | 11/2011 | Bauchot et al. | 340/10.4 |
| 8,136,025 B1 | 3/2012 | Zhu | |
| 2002/0010741 A1 * | 1/2002 | Stewart et al. | 709/204 |
| 2004/0158506 A1 | 8/2004 | Wille | |
| 2006/0155770 A1 | 7/2006 | Asher | |
| 2006/0193317 A1 | 8/2006 | Rajagopalan | |
| 2007/0018002 A1 | 1/2007 | Lapstun | |
| 2007/0106673 A1 * | 5/2007 | Enenkiel | 707/10 |
| 2007/0143853 A1 | 6/2007 | Tsukamoto | |
| 2007/0156842 A1 * | 7/2007 | Vermeulen et al. | 709/217 |
| 2007/0276928 A1 * | 11/2007 | Rhoads et al. | 709/219 |
| 2008/0021837 A1 | 1/2008 | Chang | |
| 2008/0033835 A1 | 2/2008 | Philyaw | |
| 2008/0046263 A1 | 2/2008 | Sager | |
| 2008/0126318 A1 * | 5/2008 | Frankovitz | 707/3 |
| 2008/0288561 A1 | 11/2008 | Croisettier | |
| 2008/0307197 A1 | 12/2008 | Calvin | |
| 2009/0024655 A1 | 1/2009 | Stuhec | |
| 2009/0036188 A1 | 2/2009 | Gelman | |
| 2009/0222285 A1 | 9/2009 | Silverbrook | |
| 2009/0230190 A1 | 9/2009 | Chanez | |
| 2009/0234756 A1 | 9/2009 | Omatsu | |
| 2009/0274293 A1 | 11/2009 | Barnett | |
| 2010/0030800 A1 | 2/2010 | Brodfuehrer | |
| 2010/0094878 A1 * | 4/2010 | Soroca et al. | 707/748 |
| 2010/0235372 A1 | 9/2010 | Camble | |
| 2011/0009179 A1 * | 1/2011 | Tomei | 463/19 |
| 2011/0087786 A1 * | 4/2011 | Chandrachood et al. | 709/226 |
| 2011/0095872 A1 * | 4/2011 | Bhadriraju et al. | 340/10.52 |
| 2011/0138036 A1 * | 6/2011 | Tyree | 709/224 |

OTHER PUBLICATIONS

"Serial Number Management (LO-MD-SN)", Release 4.6C, Apr. 2001, copyright 2000 SAP AG, p. 1.

* cited by examiner

ALLOCATING UNIQUE IDENTIFIERS USING METADATA

CROSS-REFERENCE TO RELATED APPLICATION

This patent application is related to U.S. patent application Ser. No. 12/767,146, now co-pending, entitled "Generating Unique Identifiers," filed on Apr. 26, 2010.

BACKGROUND

Unique identifiers are used in a variety of arrangements to help identify particular objects. Typically a number of suppliers, for example, wholesale retailers use bar codes to track inventory, usage of entities and for devising marketing strategies and business analytics. In order to track each individual unit of a good, it needs to be uniquely identified, preferably within the same class of products, using some appropriate methodology. In retail industry as an example, depending on the type of the goods, packaging level and technology used to tag the identifiers (e.g., bar code, RFID etc) there are various encoding schemes and standards to encode various objects.

BRIEF SUMMARY

Embodiments of the invention are directed to a method, a system and a computer program product for allocating identifiers. Accordingly, embodiments of the invention identify a plurality of subgroups of identifiers including at least a first subgroup of identifiers and a second subgroup of identifiers within an identifier range. Embodiments of the invention further generate a first set of identifiers in the first subgroup, and compare the first set of identifiers in the first subgroup with a second set of identifiers in the second subgroup and identify a first set of common identifiers. Embodiments of the invention further generate a third set of identifiers by eliminating the first set of common identifiers from the first set of identifiers. Embodiments of the invention further compare the third set of identifiers with a fourth set of identifiers in a repository of stored identifiers, and identify a second set of common identifiers. Embodiments of the invention further generate a fifth set of identifiers by eliminating the second set of common identifiers from the third set of identifiers.

BRIEF DESCRIPTION OF THE SEVERAL VIEWS OF THE DRAWINGS

Embodiments of the invention are described below, by way of example only, with reference to the following schematic drawings, where.

DETAILED DESCRIPTION

In mass production scenarios where the number of items produced per unit time is high, a large number of identifiers are typically requested before starting production of each batch. There is also a possibility that multiple manufacturing lines may request identifiers for the same product almost concurrently. In such cases, it is desirable to generate, record and allocate identifiers as quickly as reasonably possible.

In order to make it difficult for counterfeiters to guess a next product or service identifier or set of identifiers, it is desirable that identifiers follow a somewhat random, or at least non-sequential, pattern. At the same time, however, it may be desired for the identifiers to be within a limited range, such as numeric identifiers within a limited numeric range. Further, it may be desirable to create or select identifiers in a manner such that the identifiers can be replicated one-by-one, which may be for various reasons, such as legal auditing or reporting.

It is also, of course, necessary to avoid duplication of the identifiers assigned to individual products or services. One approach to avoiding duplication is to incorporate comparison of previously assigned identifiers into the identifier generating process. Thus, of course, requires maintaining a record of identifiers that have been assigned to products or services. But this tends to slow down identifier generation, particularly since this typically involves operations such as inserting and updating data rows for an ever-increasing number of identifiers.

Another approach is to assign identifiers in a manner wherein non-duplication is guaranteed by an identifier generation algorithm itself, that is, an algorithm that guarantees non-duplication of assigned identifiers without having to refer to individual, previously assigned identifiers. The algorithmically guaranteed approach works reasonably fast and satisfactorily for providing session identifiers or tokens, for example. However, it may be problematic to control a number space from within which the identifiers are provided for this approach. Also, the algorithmically guaranteed approach may not provide an easy way to enumerate the assigned identifiers.

Figure 1:
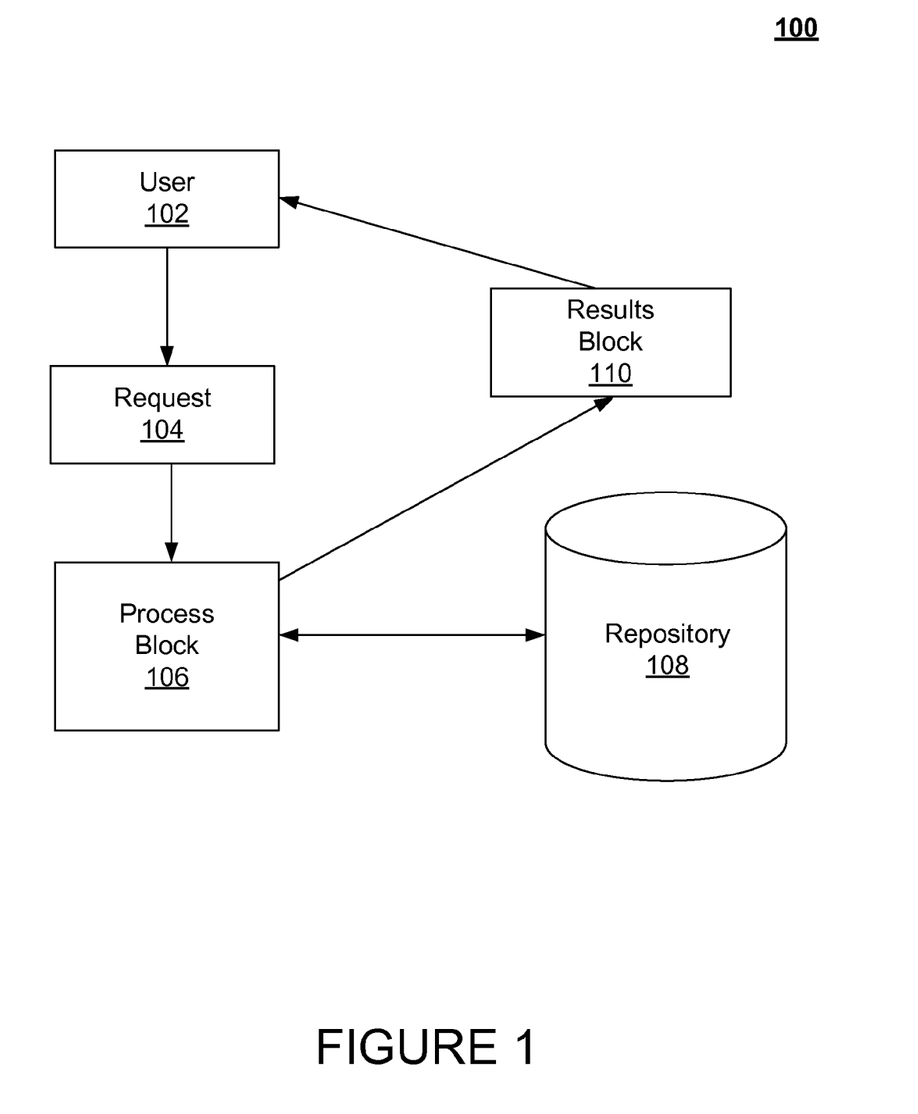
FIG. 1 depicts a conventional, schematic of allocating identifiers as disclosed in the prior art.

Embodiments of the invention are directed to a method, a system and a computer program product for allocating identifiers. FIG. 1 shows a schematic 100 of mechanics for creating a set of identifiers, according to an approach that incorporates comparison of stored identifiers into an identifier allocating process. FIG. 1 shows a user 102 transmitting a request 104 to a process block 106, wherein process block 106 is configured to generate identifiers upon receiving the request from user 102. Request 104 also indicates a required number of requested identifiers. Process block 106 communicates with a repository 108 to generate a new set of identifiers, and transmits the new set of identifiers to a results block 110. Results block 110 communicates the new set of identifiers to user 102.

According to this approach, repository 108 stores identifiers deemed unavailable for new allocation, i.e., identifiers that have already been committed for use, or at least stores an indication thereof. When new identifiers are generated, the unavailable identifiers could be retrieved from repository 108 for comparison with the new identifiers, in order to avoid duplication. However, this retrieval is a time and resource intensive operation. Further, sets of identifiers may be generated concurrently. Therefore, repository 108 may not have a list of all identifiers that are merely in the process of being allocated for use, or at least may not indicate their commit status. Consequently, according to an embodiment of the present invention, determination of unavailable identifiers includes the following.

At least one automated process 106 generates sets of new identifiers. It generates each set of identifiers from respective contiguous blocks (also referred to herein as "groups" or "subgroups") defining ranges of sequential identifiers. When process 106 begins generating identifiers, it communicates with repository 108, which includes storing metadata in repository 108. This metadata that may be provided as an input to automated process 106 that enables process 106 to reproduce a predefined set of identifiers. The metadata may include a starting seed number, an ending seed number, and a technique used for generating the identifiers.

Among other things that are done in order to provide new identifiers that do not duplicate any unavailable identifiers, responsive to a request for new identifiers process 106 selects a block defining a range within which it will generate the new identifiers and stores metadata in repository 108 that indicates the range of the selected block. The metadata may also include a seed and identification of a type algorithm that uses the seed and range for generating the identifiers.

Process 106 selects the block responsive to "pending blocks," i.e., blocks for which other identifiers are currently being generated, or at least for which all identifier commit status has not yet been updated in repository 108. Process 106 also retrieves metadata from repository 108 for any pending block that defines a range overlapping the range of the selected block for the new identifiers. For any pending block for which process 106 retrieved metadata, process 106 generates a set of identifiers using the pending block's retrieved metadata. Then process 106 compares the set of identifiers it generated for the pending block to the new identifiers it generated for the new request and eliminates from the set of newly generated identifiers all identifiers matching the pending block's identifiers in order to avoid duplication. Process 106 may repeat the generation of new identifiers, retrieval of metadata, reproduction of pending block identifiers, comparison and elimination until the requested number of identifiers is obtained.

Figure 2:
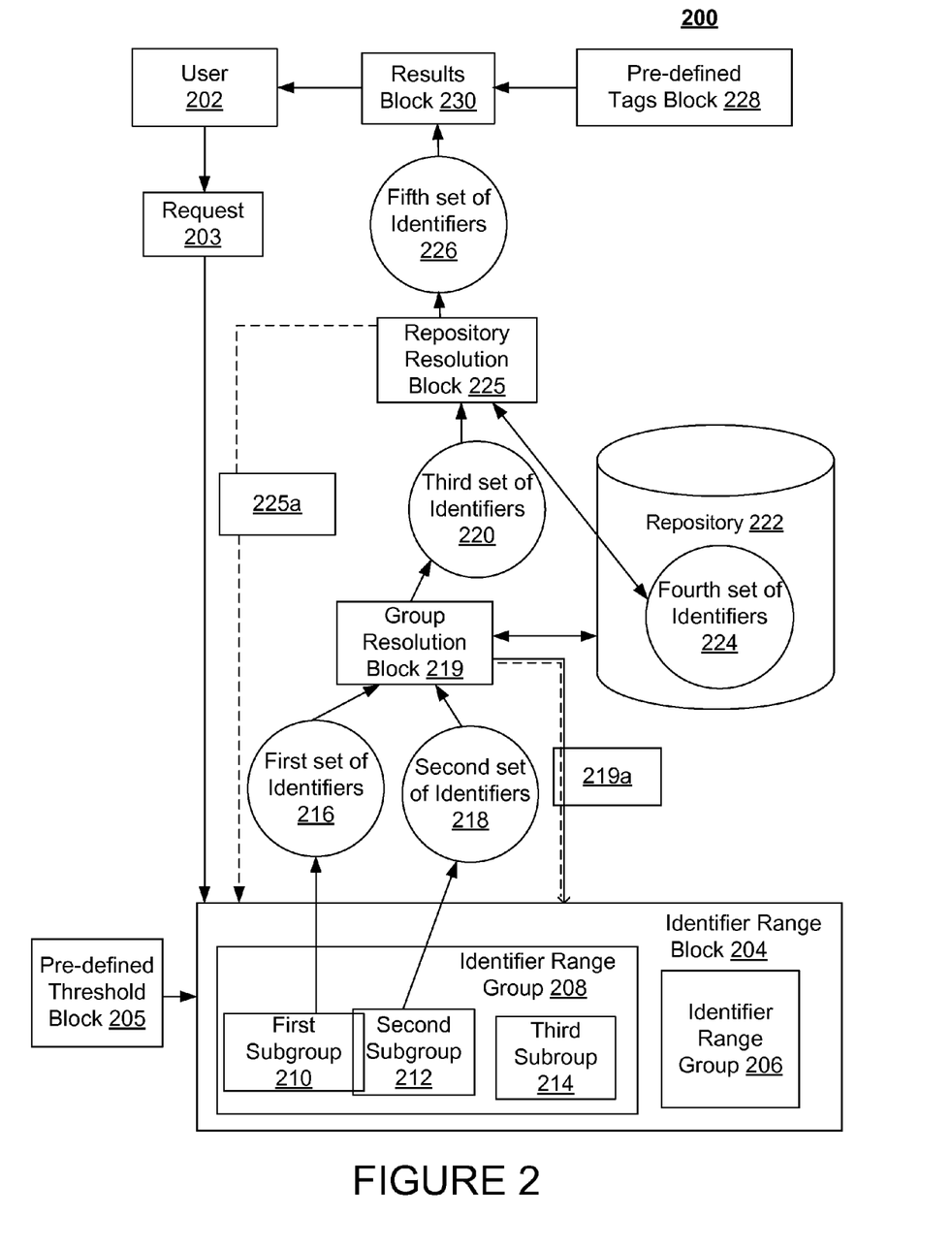
FIG. 2 shows a schematic of a mechanism of allocating identifiers according to an exemplary embodiment of the invention.

FIG. 2 shows a more detailed schematic 200 of a mechanism for allocating identifiers according to an exemplary embodiment of the present invention that more specifically addresses issues described herein above. FIG. 2 shows a user 202, transmitting a request 203 to an identifier range block 204, wherein block 204 responsively provides identifiers for allocation to products or services.

Request 203 in one embodiment indicates a pre-defined number of identifiers. FIG. 2 further depicts a pre-defined threshold block 205 interfacing with identifier set block 204. In an embodiment of the invention, pre-defined threshold block 205 provides a pre-determined number that is added to the number of identifiers that was indicated in request 203. By generating identifiers in a quantity larger than the number requested, chances are improved that enough non-duplicate identifiers will be generated without excessive iteration.

FIG. 2 further depicts a repository 222, a group resolution block 219, a repository resolution block 225, a pre-defined tags block 228 and a results block 230. FIG. 2 further depicts a plurality of identifier range groups. In an exemplary instance, identifier range block 204 has a sequential range from 1 through 200, within which is identifier range group 208 having a sequential range from 1 through 50 and another identifier range group 206 having a sequential range from 51 through 100. (It should be understood that in actual practice the ranges of identifiers may be much larger, or may even be smaller.)

In an exemplary instance, request 203 indicates four new identifiers are wanted from within a range of 1-20, which falls within identifier range group 208. Responsive to request 203, process 106 (FIG. 1) selects first subgroup 210, having a numerically sequential range from 1 through 13. (Accordingly, process 106 will generate the four requested new identifiers from within the range of subgroup 210.) As will be explained in more detail herein further below, process 106 does the selecting of subgroup 210 responsive to the ranges of already pending subgroups that define ranges within that of subgroup 208, i.e., the subgroup defining a range bounding the new identifiers of request 203. In the illustrated instance, these pending subgroups are second subgroup 212, having a sequential range from 12 through 16 and third subgroup 214, having a sequential range from 18 through 20.

There may be several advantages to, or purposes for, partitioning identifier range group 208 into ranges, e.g., subgroups 210, 212 and 214. Collectively, subgroups 210, 212 and 214 limit allocation of identifiers to an overall range, which may be advantageous. Individually, each subgroup may define identifier ranges for respective business requirements. A category of products or services may have a numeric range of identifiers corresponding to the range of subgroup 210, for example. It may also be advantageous to limit identifier overlaps. In an embodiment, first subgroup 210 of identifiers has a range overlap with second subgroup 212 but not with third subgroup 214. In the above described exemplary instance, the overlap is the range from 12 through 13.

FIG. 2 further depicts process 106 (FIG. 1) generating first set 216 of identifiers responsive to new request 203, where the identifiers are limited to the identifier range of first subgroup 210. In an exemplary instance, the indicated number of identifiers in request 203 is 4 and the pre-defined threshold indicated by block 205 is 3. Consequently, the total number of identifiers in the first set 216 is 4+3=7 for the indicated instance. In an exemplary instance, process 106 randomly generates for first set 216 identifiers (1, 2, 3, 5, 9, 12, 13) according to stored instructions of a random number generator algorithm, wherein the identifiers are generated from within the range of subgroup 210.

The possibility of duplicating identifiers is a concern when generating new identifiers concurrently with other pending identifiers (e.g., identifiers from within the ranges of subgroups 212 and 214 that are currently being generated, or for which there are at least still status updates being performed). Therefore, in response to the new request 203 for generating identifiers, process 106 obtains metadata regarding pending identifiers, e.g., subgroups 212 and 214 in the illustrated instance. The metadata indicates the ranges of the pending subgroups.

Pending subgroups 212 and 214 illustrate two different circumstances with regard to subgroup 210. That is, it is not possible for identifiers that are pending within the range of subgroup 214 to be duplicates of identifiers newly generated and within the range of subgroup 210, since subgroups 210 and 214 define ranges that do not overlap. On the other hand, for subgroups 210 and 212, duplication of identifiers is possible, since the subgroups overlap. Responsive to determining that there is an overlap in range between subgroups 210 and 212, process 106 takes duplication avoidance action, which is illustrated as follows.

FIG. 2 further shows second set 218 of identifiers, which are the identifiers pending within the range of pending second subgroup 212 for a different request 203. Having determined that there is an overlap in range between subgroups 210 and 212, process 106 takes further action to determine whether the identifiers generated in connection with subgroup 210 duplicate any pending identifiers in connection with subgroup 212. Specifically, process 108 retrieves metadata from repository 222 for identifier second set 218 and then generates the identifiers of second set 218 responsive to the metadata. In an exemplary instance, identifiers of set 218 are (12,14,15).

According to an embodiment of the present invention, group resolution block 219 compares first set 216 of identifiers with second set 218 of identifiers to determine if sets 216 and 218 have any identifiers in common (referred to herein as a "first set of common identifiers"). If common identifiers are found, then by eliminating the common identifiers from first set of identifiers 216, block 219 generates a third set 220 of identifiers. Note that in the exemplary instances illustrated, first and second sets 216 and 218 have a numeric identifier (12) in common. Eliminating the numeric identifier (12) from first set 216 of identifiers generates third set 220 of identifiers, which in the exemplary instance includes six numeric identifiers (1, 2, 3, 5, 9, 13).

Group resolution block 219 is configured to check whether the number of identifiers in third set 220 is more than or equal to the pre-defined number of identifiers in request 203. If block 219 determines that the number of identifiers in third set 220 is less than the pre-defined number of identifiers in the request, block 219 hands off to a different group resolution block 219a, which notifies identifier set block 204 to repeat the process of identifier generation, until the required set of identifiers is obtained. If block 219 determines that the number of identifiers in third set 220 is not less than the pre-defined number of identifiers in the request, block 219 passes control to repository resolution block 225.

Fourth set 224 has identifiers that have already been generated and for which commit status has already been fully updated for use on current products or services. (This committed status may be indicated by storage of the fourth set 224 of identifiers in repository 222, or by a way in which they are stored therein, such by as a location therein or by a tag or other metadata associated with them.) Having been handed control from block 219, repository resolution block 225 reads the identifiers of fourth set 224 from repository 222 and compares them with identifiers of third set 220 to find any common identifiers (referred to herein as a "second set of common identifiers"). If the second set of common identifiers exists, then a block 225 generates a fifth set 226 of identifiers by eliminating the second set of common identifiers from third set 220. Repository resolution block 225 is configured to then check whether the number of identifiers in fifth set 226 is more than or equal to the pre-defined number of identifiers in request 203.

If block 225 determines the number of identifiers in fifth set 226 is less than the indicated number of identifiers in request 203 made by the user, block 225 hands off to a different repository resolution block 225a, which notifies identifier set block 204 to repeat the process of identifier generation until the required set of identifiers is obtained. If block 225 determines the number of identifiers in fifth set 226 is at least as large as the indicated number of identifiers in request 203, block 225 passes control to results block 230, which selects from fifth set 226 the number of identifiers indicated by request 203. The identifiers selected from fifth set 226 by results block 230 provides a modified fifth set.

In an exemplary instance, third set 220 includes identifiers (1, 2, 3, 5, 9, 13) and fourth set 224 includes identifiers (1, 11, 56, 78), so that the second set of common identifiers is the set of identifiers (1). Thus, in the exemplary instance, eliminating the second set of common identifiers from third set 220 yields identifiers (2, 3, 5, 9, 13) for fifth set 226, which provides five identifiers, a number greater than requested. Modified fifth set, in an exemplary instance, includes identifiers (2, 3, 5, 9).

Results block 230 is further configured to associate a set of pre-defined tags from pre-defined tags block 228, with the modified fifth set of identifiers and transmit the result to user 202. In an exemplary mode, a pre-defined tag may be an alpha-numeric code, say "ABC 123" for a product1.

Results block 230 is configured to update fifth set 226 of identifiers in repository 222 as a background activity to insert allocation details. That is, results block 230 is configured to mark the identifiers of fifth set 226 that were not allocated for use, thereby releasing them for future use, and to mark as "committed" the identifiers that were allocated, i.e., the identifiers of the modified fifth set, thereby rendering them completely unavailable for future use.

Figure 3:
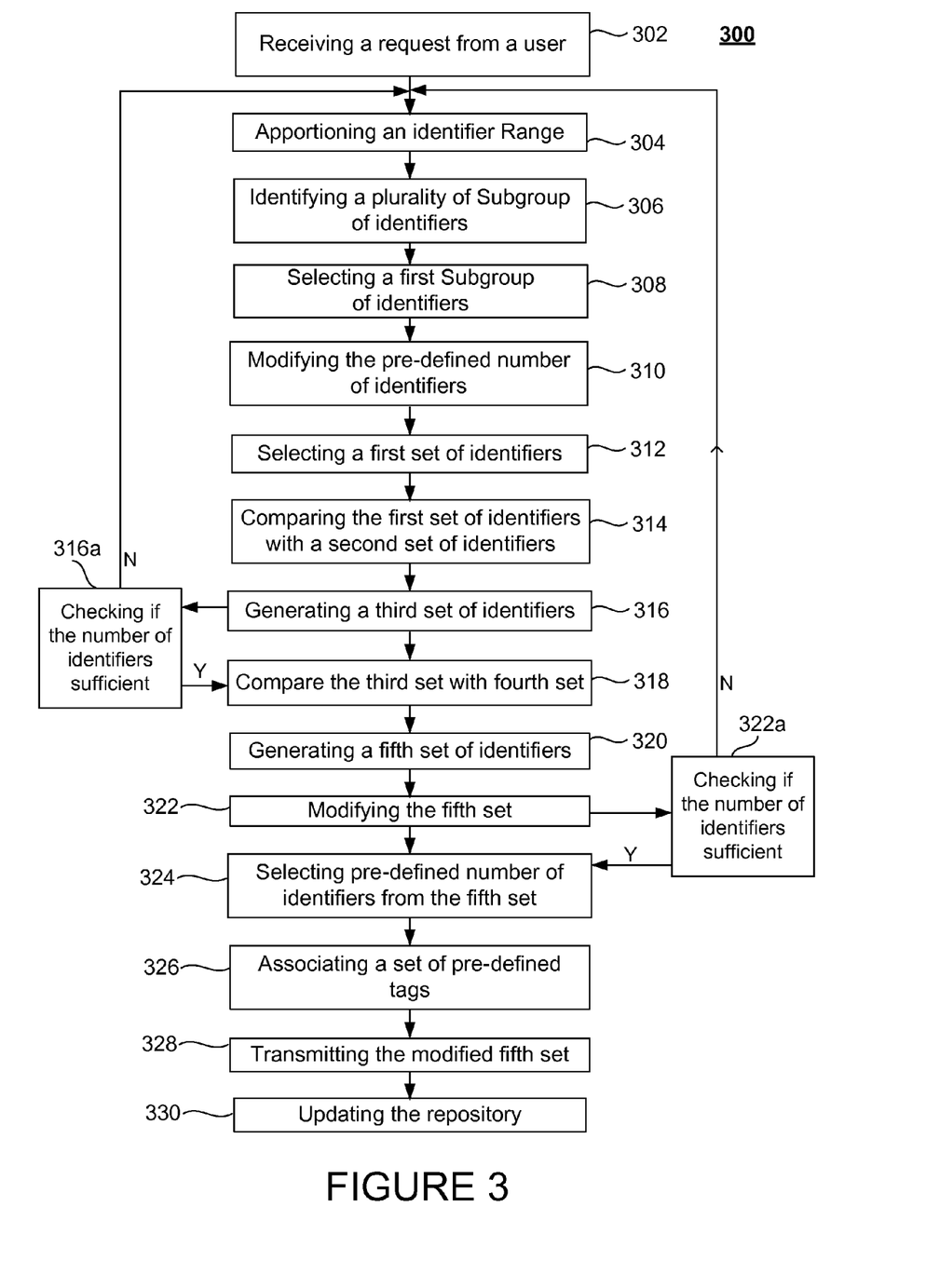
FIG. 3 shows a flow chart for allocating identifiers as disclosed in one embodiment of the invention.

FIG. 3 shows a flow chart of a method 300 for allocating identifiers as disclosed for an exemplary embodiment of the invention. Process 302 depicts receiving a request for identifiers from a user. In one embodiment, the request indicates how many identifiers the user needs, thus providing a pre-defined number of requested indicators. Process 304 depicts providing a set of identifiers from which identifiers may be allocated for the user request. In an embodiment of the invention, the identifiers are generated in response to the request and are at least potentially available as candidates for allocation. In an alternative, the set of identifiers is provided from a store of pre-existing identifiers that are at least potentially available as candidates for allocation.

Process 304 includes apportioning the identifier range into a plurality of identifier range groups. Step 306 depicts identifying a plurality of subgroups within at least one of the identifier range groups.

Step 308 depicts selecting one of the subgroups from among the plurality of subgroups of identifiers, wherein the selected subgroup (referred to herein as the "first subgroup") has least overlap with the remaining subgroups. Step 310 shows modifying the pre-defined requested number of identifiers using a pre-defined threshold, which results in a larger number than that defined in the request. This modification is performed, in one embodiment, according to a user-defined rule, which may be based on known historical yields of identifier sets in generating identifiers, the number of identifiers requested, and other parameters.

Step 312 depicts selecting a first set of identifiers from within the range of the first subgroup. In one embodiment, the number of identifiers in the first set is in response to the modified, pre-defined number of identifiers.

Step 314 shows comparing the first set of identifiers from the first subgroup with a second set of identifiers from a second one of the subgroups to identify a first set of common identifiers using metadata of the second set of identifiers. The second set of identifiers is from a second one of the subgroups. The comparing is in order to identify a first set of common identifiers. That is, if the first subgroup of identifiers and the second subgroup of identifiers have an overlap, then allocating identifiers that are in both of the sets that were selected from these subgroups may result in undesirable duplication of identifiers, even if none of the allocated identifiers are already committed for use somewhere else besides for these two subgroups.

In one embodiment, metadata of the in-common identifiers from the second set of identifiers is used to identify the uncommitted status of identifiers. The metadata may include a starting seed number, an ending seed number, and a technique used for generating the identifiers.

Process 316 depicts generating a third set of identifiers by eliminating from the first set those identifiers that the first and second sets have in common (that is, a first set of "common identifiers"). In one embodiment, step 316a may be performed, in which the number of identifiers in the third set of identifiers is checked to see whether the number is more than or equal to the pre-defined number of identifiers in the request, or else, alternatively to see whether the number is more than or equal to the modified, pre-defined requested number of identifiers. If the number of identifiers in the third set of identifiers is less than the pre-defined number to which it is compared, step 304 is performed again.

If the number of identifiers in the third set of identifiers is more than or equal to the pre-defined number of identifiers, process 318 is performed, which includes accessing a fourth set of identifiers, or at least accessing information about them, such as metadata for the fourth set of identifiers. The fourth set has identifiers that are stored in the repository because they already committed to be used on products or services. They are, accordingly, unavailable. Process 318 shows comparing the third set of identifiers with the fourth set of identifiers to identify a second set of common identifiers. The comparison reveals that some identifiers in the third set of identifiers (i.e., the identifiers in the second set of common identifiers) are committed identifiers. If the second set of common identifiers is not eliminated from the third set, then there will be undesirable duplication of identifiers. Process 320 depicts generating a fifth set of identifiers by eliminating the second set of common identifiers from the third set of identifiers.

Step 322 depicts modifying the fifth set of identifiers. In one embodiment, step 322a may be performed by checking whether the number of identifiers in the fifth set of identifiers is more than or equal to the pre-defined number of identifiers in the request, or else, alternatively to see whether the number is more than or equal to the modified, pre-defined requested number of identifiers. If the number of identifiers in the fifth set of identifiers is less than the number to which it is compared, step 304 is performed. If the number of identifiers in the fifth set of identifiers is more than or equal to the number to which it is compared, step 324 is performed.

Step 324 depicts selecting the pre-defined number of identifiers from the fifth set of identifiers. Step 326 shows associating a set of pre-defined tags to the selected identifiers; and step 328 depicts transmitting the modified fifth set of identifiers to the user. Step 330 shows updating the repository of stored identifiers with at least one of the modified fifth set of identifiers or the metadata of the modified fifth set of identifiers. The update of step 330 includes updating the repository as a background activity and includes insertion of allocation details from multiple sets of identifiers into the repository.

Figure 4:
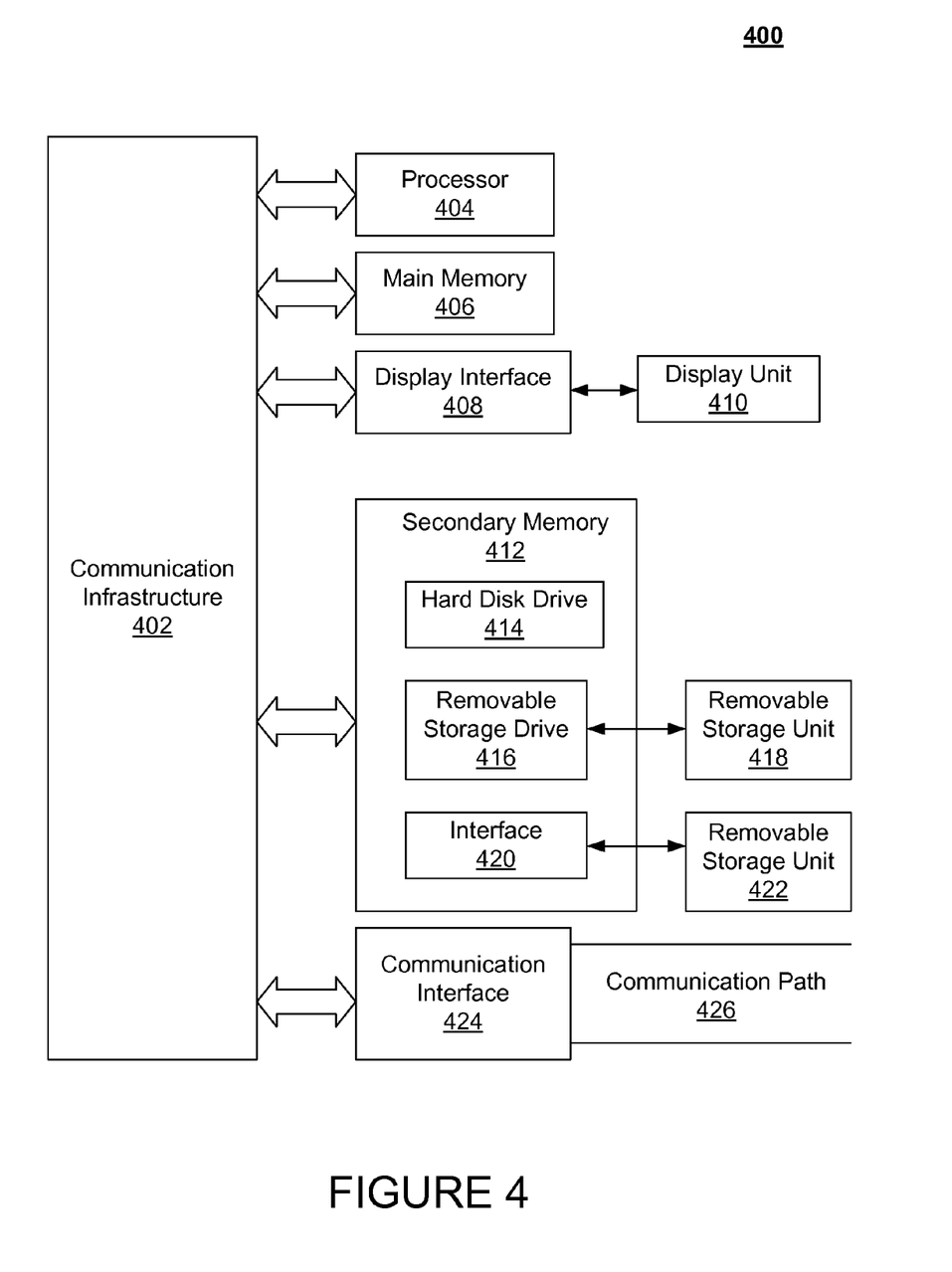
FIG. 4 shows a detailed schematic of a computer system used for allocating identifiers as disclosed in FIG. 2 and FIG. 3.

FIG. 4 shows a detailed schematic of a computer system used for allocating identifiers. FIG. 4 is a block diagram of an exemplary computer system 400 that can be used for implementing various embodiments of the invention. In some embodiments, computer system 400 can be used as a system performing the actions described herein. Computer system 400 includes microprocessor 404. It should be understood although FIG. 4 illustrates a single microprocessor, one skilled in the art would appreciate that more than one processor can be included as needed. Microprocessor 404 is connected to a communication infrastructure 402 (for example, a communications bus, cross-over bar, or network), where the communication infrastructure 404 is configured to facilitate communication between various elements of the exemplary computer system 400. Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCM-CIA slot and card, etc. Software and data transferred via the communications interface 424 are in the form of signals which may be, for example, electronic, electromagnetic, optical, or other signals capable of being received by communications interface 424. These signals are provided to the communications interface 424 via a communications path (that is, channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to a storage media for providing software to computer system 400, such as main memory 406 and secondary memory 412, removable storage drive 416 and a hard disk installed in hard disk drive 414. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems.

Furthermore, computer readable information may also be provided to computer system 400 via a transmission medium such as a network link and/or a network interface, including a wired network or a wireless network that allows a computer to read such computer readable information.

Computer programs (also referred to herein as computer control logic) are stored in main memory 406 and/or secondary memory 412. Computer programs may also be received via communications interface 424. Such computer programs, when executed, enable computer system 400, particularly at least one microprocessor 404, to perform features of exemplary embodiments of the present invention as discussed herein. Accordingly, such computer programs represent controllers of computer system 400.

Embodiments of the invention also provide a system for allocating identifiers, the system including at least one microprocessor and at least one memory. Embodiments of the invention further provide a computer program product for allocating identifiers, the computer program product including a computer readable storage medium having computer readable program code embodied therewith, the computer readable program code including computer readable program code configured to carry out a method of allocating identifiers as described in detail in various embodiments set forth above.

Advantages of various embodiments of the invention include improved performance and less response time. Advantages of various embodiments of the invention also include reduced storage needed for allocating identifiers and efficient retrieval.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium is accessed and executed by a microprocessor. The code or logic may also be provided by transmission signals propagating through space or a transmission media, such as an optical fiber, copper wire, etc. The transmission signal in which the code or logic is encoded and delivered may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time instance.

The terms "certain embodiments," "an embodiment," "embodiment," "embodiments," "the embodiment," "the embodiments," "one or more embodiments," "some embodiments," and "one embodiment" mean one or more (but not all) embodiments unless expressly specified otherwise. The terms "including," "comprising," "having" and variations thereof mean "including but not limited to," unless expressly specified otherwise. The enumerated listing of items does not imply that any or all of the items are mutually exclusive, unless expressly specified otherwise. The terms "a," "an" and "the" mean "one or more," unless expressly specified otherwise.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the invention have been described in detail, it should be understood that various changes, substitutions and alternations could be made thereto without departing from spirit and scope of the inventions as defined by the appended claims. For example, in embodiments of the invention, process 106 alternatively generates identifiers in a sequential order, instead of in a random order as described herein above. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the invention.

What is claimed is:

1. A method for allocating identifiers implemented on a computing device, the method comprising:
    receiving, by a processor, a request from a user for allocating identifiers including a pre-defined number of identifiers;
    in response to receiving the request, the processor:
        identifying a plurality of subgroups of identifiers within an identifier range, wherein the plurality of subgroups of identifiers includes at least a first subgroup of identifiers and a second subgroup of identifiers;
        selecting a first set of identifiers from within the range of the first subgroup of identifiers;
        comparing the first set of identifiers from the first subgroup of identifiers with a second set of identifiers from the second subgroup of identifiers to identify a first set of common identifiers using metadata of the second set of identifiers, wherein, the first set of identifiers and the second set of identifiers comprise at
least the common identifiers; and
generating a third set of identifiers by eliminating the
first set of common identifiers from the first set of
identifiers, wherein the second subgroup of identifiers
are at least pending for use when the first set of identifiers is selected from within the range of the first
subgroup of identifiers, and wherein the identifying
the first set of common identifiers using metadata of
the second set of identifiers comprises:
generating the second set of identifiers responsive to
the metadata instead of retrieving all the second set
of identifiers from a storage device; and;
further in response to receiving the request, the processor:
transmitting the third set of identifiers to the user.

2. The method of claim 1, wherein the first set of identifiers and the second set of identifiers are random numbers.

3. The method of claim 1, wherein selecting the first set of identifiers from within the range of the first subgroup further comprises:
selecting the first subgroup of identifiers responsive to the first subgroup of identifiers having minimal overlap with remaining subgroups that have pending identifiers amongst the plurality of subgroups of identifiers.

4. The method of claim 1, further comprising:
comparing the third set of identifiers with a fourth set of identifiers in a repository having stored identifiers, to identify a second set of common identifiers; and
generating a fifth set of identifiers by eliminating the second set of common identifiers from the third set of identifiers.

5. The method of claim 4, wherein the repository of stored identifiers is at least one of a structured data or an unstructured data.

6. The method of claim 1, further comprising:
apportioning the identifier range in a plurality of identifier range groups, wherein the at least one identifier range groups comprises the plurality of subgroups of identifiers, and wherein the identifier range is used for allocating identifiers.

7. The method of claim 6, further comprising:
modifying the pre-defined number of identifiers based on a pre-defined threshold.

8. The method of claim 7, further comprising:
modifying the fifth set of identifiers;
selecting the pre-defined number of identifiers from the fifth set of identifiers;
associating a set of pre-defined tags to the selected identifiers from the fifth set of identifiers; and
transmitting the modified fifth set of identifiers to the user.

9. The method of claim 8, further comprising:
updating the repository having stored identifiers with at least one of the modified fifth set of identifiers or the metadata of the modified fifth set of identifiers.

10. A system for allocating identifiers, the system comprising at least one processor and at least one memory, wherein the processor is operated to:
receive a request from a user for allocating identifiers including a pre-defined number of identifiers;
in response to receiving the request:
identify a plurality of subgroups of identifiers within an identifier range, wherein the plurality of subgroups of identifiers includes at least a first subgroup of identifiers and a second subgroup of identifiers;
select a first set of identifiers from within the range of the first subgroup of identifiers;
compare the first set of identifiers from the first subgroup of identifiers with a second set of identifiers from the second subgroup of identifiers to identify a first set of common identifiers using metadata of the second set of identifiers, wherein, the first set of identifiers and the second set of identifiers comprise at least the common identifiers; and
generate a third set of identifiers by eliminating the first set of common identifiers from the first set of identifiers, wherein the second subgroup of identifiers are at least pending for use when the first set of identifiers is selected from within the range of the first subgroup of identifiers, and wherein the identify the first set of common identifiers using metadata of the second set of identifiers comprises:
generating the second set of identifiers responsive to the metadata instead of retrieving all the second set of identifiers from a storage device; and;
further in response to receiving the request, the processor to:
transmit the third set of identifiers to the user.

11. The system of claim 10, wherein the first set of identifiers and the second set of identifiers are random numbers.

12. The system of claim 10, wherein the processor is further operated to:
select the first subgroup of identifiers responsive to the first subgroup of identifiers having minimal overlap with remaining subgroups that have pending identifiers amongst the plurality of subgroups of identifiers.

13. The system of claim 10, wherein the processor is further operated to:
compare the third set of identifiers with a fourth set of identifiers in a repository having stored identifiers, to identify a second set of common identifiers; and
generate a fifth set of identifiers by eliminating the second set of common identifiers from the third set of identifiers.

14. The system of claim 10, wherein the processor is further operated to:
apportion the identifier range in a plurality of identifier range groups, wherein the at least one identifier range groups comprises the plurality of subgroups of identifiers, and wherein the identifier range is used for allocating identifiers; and
modify the pre-defined number of identifiers based on a pre-defined threshold.

15. The system of claim 14, wherein the processor is further operated to:
modify the fifth set of identifiers;
select the pre-defined number of identifiers from the fifth set of identifiers;
associate a set of pre-defined tags to the selected identifiers from the fifth set of identifiers; and
transmit the modified fifth set of identifiers to the user.

16. The system of claim 15, wherein the processor is further operated to:
update the repository having stored identifiers with at least one of the modified fifth set of identifiers or the metadata of the modified fifth set of identifiers.

17. A computer program product for allocating identifiers, the computer program product comprising:
a computer readable storage device having computer readable program code embodied therewith, the computer readable program code comprising computer readable program operated to:
receive a request from a user for allocating identifiers including a pre-defined number of identifiers;

in response to receiving the request:
  identify a plurality of subgroups of identifiers within an identifier range, wherein the plurality of subgroups of identifiers includes at least a first subgroup of identifiers and a second subgroup of identifiers;
  select a first set of identifiers from within the range of the first subgroup of identifiers;
  compare the first set of identifiers from the first subgroup of identifiers with a second set of identifiers from the second subgroup of identifiers to identify a first set of common identifiers using metadata of the second set of identifiers, wherein, the first set of identifiers and the second set of identifiers comprise at least the common identifiers; and
  generate a third set of identifiers by eliminating the first set of common identifiers from the first set of identifiers, wherein the second subgroup of identifiers are at least pending for use when the first set of identifiers is selected from within the range of the first subgroup of identifiers, and wherein the identify the first set of common identifiers using metadata of the second set of identifiers comprises:
    generating the second set of identifiers responsive to the metadata instead of retrieving all the second set of identifiers from a storage device; and;
  further in response to receiving the request:
    transmit the third set of identifiers to the user.

18. The computer program product of claim 17, wherein the first set of identifiers and the second set of identifiers are random numbers.

19. The computer program product of claim 17, further operated to:
  select the first subgroup of identifiers responsive to the first subgroup of identifiers having minimal overlap with remaining subgroups that have pending identifiers amongst the plurality of subgroups of identifiers.

20. The computer program product of claim 17, further operated to:
  compare the third set of identifiers with a fourth set of identifiers in a repository having stored identifiers, to identify a second set of common identifiers; and
  generate a fifth set of identifiers by eliminating the second set of common identifiers from the third set of identifiers.

21. The computer program product of claim 17, further operated to:
  apportion the identifier range in a plurality of identifier range groups, wherein the at least one identifier range groups comprises the plurality of subgroups of identifiers, and
  wherein the identifier range is used for allocating identifiers; and
  modify the pre-defined number of identifiers based on a pre-defined threshold.

22. The computer program product of claim 21, further operated to:
  modify the fifth set of identifiers;
    select the pre-defined number of identifiers from the fifth set of identifiers;
    associate a set of pre-defined tags to the selected identifiers from the fifth set of identifiers;
    transmit the modified fifth set of identifiers to the user; and
  update the repository having stored identifiers with at least one of the modified fifth set of identifiers or the metadata of the modified fifth set of identifiers.

* * * * *